(12) United States Patent
Feinberg et al.

(10) Patent No.: US 7,089,491 B2
(45) Date of Patent: Aug. 8, 2006

(54) SYSTEM AND METHOD FOR ENHANCING XML SCHEMAS

(75) Inventors: Bonnie Nicole Feinberg, Redmond, WA (US); Bryan Richard Franz, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 700 days.

(21) Appl. No.: 10/138,687

(22) Filed: May 3, 2002

(65) Prior Publication Data
US 2003/0208498 A1 Nov. 6, 2003

(51) Int. Cl.
G06F 17/00 (2006.01)
G06F 15/00 (2006.01)
G06F 17/21 (2006.01)
G06F 17/24 (2006.01)

(52) U.S. Cl. .................. 715/522; 715/513; 715/523; 715/524

(58) Field of Classification Search .............. 715/513, 715/522–524
See application file for complete search history.

(56) References Cited

U.S. PATENT DOCUMENTS

| | | | | |
|---|---|---|---|---|
| 6,083,276 A | * | 7/2000 | Davidson et al. | 717/107 |
| 6,591,260 B1 | * | 7/2003 | Schwarzhoff et al. | 707/2 |
| 6,643,650 B1 | * | 11/2003 | Slaughter et al. | 707/10 |
| 6,718,371 B1 | * | 4/2004 | Lowry et al. | 709/213 |
| 6,772,206 B1 | * | 8/2004 | Lowry et al. | 709/223 |
| 6,782,379 B1 | * | 8/2004 | Lee | 707/2 |
| 6,789,077 B1 | * | 9/2004 | Slaughter et al. | 707/10 |
| 6,789,126 B1 | * | 9/2004 | Saulpaugh et al. | 709/245 |
| 6,792,466 B1 | * | 9/2004 | Saulpaugh et al. | 709/229 |
| 6,810,397 B1 | * | 10/2004 | Qian et al. | 707/6 |
| 6,816,865 B1 | * | 11/2004 | O'Brien et al. | 707/100 |
| 6,816,871 B1 | * | 11/2004 | Lee | 707/104.1 |

OTHER PUBLICATIONS

Fallside, David; XML Schema Part 0: Primer; May 2, 2001; W3C.*
Brown, Allen et al.; XML Schema: Formal Description; Sep. 25, 2001, W3C.*
Barczikay, Z. et al., "Using XML in Intelligent Product Manuals," 7th *Biennial Conference on Electronics and Microsystem Technology, Baltic Electronics Conference BEC 2000 Conference Proceedings*, 2000, 95-98 (abstract only).
Schweiger, R. et al., "DTDs go XML schema—a tools perspective," *Medical Informatics and the Internet in Medicine*, 2001, 26(4), 297-308.
Yoon, J. P. et al., "Schema Extraction and Levelization for XML Data," *Proceedings of the SPIE—The International Society for Optical Engineering*, Apr. 16-17, 2001, 4384, 116-125.

* cited by examiner

Primary Examiner—Doug Hutton
Assistant Examiner—N Hillery
(74) Attorney, Agent, or Firm—Woodcock Washburn LLP

(57) ABSTRACT

A system and method for enhancing XML schemas is presented. A schema enhancer inputs an input schema, a parameter file, and (optionally) a preamble file to generate an enhanced schema. The optional preamble file comprises definitions and syntax for elements and/or attributes to be added and/or to modify relationships in the input schema to create the enhanced schema. Instructions for modifying the input schema to generate the enhanced schema comprise the parameter file.

17 Claims, 12 Drawing Sheets

```
                              ┌─ 500
                             ↙

501      <?xml version="1.0"?>
502      <xs:schema
         targetNamespace="http://schemas.company.com/nesue/example/rt/1"
         xmlns:xs="http://www.w3.org/2001/XMLSchema"
         xmlns="http://schemas.company.com/nesue/example/rt/1">
503        <xs:element name="contact">
504          <xs:complexType>
505            <xs:sequence>
506              <xs:element name="name" type="xs:string"/>
507              <xs:element name="address" type="xs:string"/>
508              <xs:element name="phone" type="xs:string"/>
509              <xs:element name="email" type="xs:string"/>
510            </xs:sequence>
511          </xs:complexType>
512        </xs:element>
513      </xs:schema>
```

601     <?xml version="1.0"?>
602     <stp:parameters xmlns:stp="http://schemas.company.com/nesue/schemaToolParam/1">
603         <stp:targetNamespace prefix="ex" uri="http://schemas.company.com/nesue/example/rt/1"/>
604         <stp:preamble file="example-preamble.xsd"/>
605         <stp:wrapper name="wrapper"/>
606         <stp:markAttributeGroup name="languageAttribute"/>
607         <stp:exception name="email"/>
608         <stp:outputFile name="examplert.xsd"/>
609     </stp:parameters>
```

FIG. 6

```
701    <?xml version="1.0"?>
702    <xs:schema xmlns:xs="http://www.w3.org/2001/XMLSchema"
xmlns:ex="http://schemas.company.com/nesue/example/rt/1"

targetNamespace="http://schemas.company.com/nesue/example/rt/1">

703       <xs:attributeGroup name="languageAttribute"
          xmlns:xsd="http://www.w3.org/2001/XMLSchema">
704         <xs:attribute name="language">
705           <xs:simpleType>
706             <xs:restriction base="xs:string">
707               <xs:enumeration value="English"/>
708               <xs:enumeration value="French"/>
709               <xs:enumeration value="Spanish"/>
710               <xs:enumeration value="German"/>
711               <xs:enumeration value="other"/>
712             </xs:restriction>
713           </xs:simpleType>
714         </xs:attribute>
715       </xs:attributeGroup>

716       <xs:element name="wrapper"
xmlns:ex="http://schemas.company.com/nesue/example/rt/1">
717         <xs:complexType mixed="true">
718           <xs:attributeGroup ref="ex:languageAttribute"/>
719         </xs:complexType>
720       </xs:element>

721    </xs:schema>
```

801    <?xml version="1.0"?>
802    <xsd:schema xmlns:ex="http://schemas.company.com/nesue/example rt/1"
       elementFormDefault="qualified" targetNamespace="http://schemas.company.
       com/nesue/example/rt/1" xmlns:xsd="http://www.w3.org/2001/XMLSchema">
803              <xsd:attributeGroup name="languageAttribute">
804                <xsd:attribute name="language">
805                  <xsd:simpleType>
806                    <xsd:restriction base="xsd:string">
807                      <xsd:enumeration value="English" />
808                      <xsd:enumeration value="French" />
809                      <xsd:enumeration value="Spanish" />
810                      <xsd:enumeration value="German" />
811                      <xsd:enumeration value="other" />
812                    </xsd:restriction>
813                  </xsd:simpleType>
814                </xsd:attribute>
815              </xsd:attributeGroup>
816              <xsd:element name="wrapper">
817                <xsd:complexType mixed="true">
818                  <xsd:attributeGroup ref="ex:languageAttribute" />
819                </xsd:complexType>
820              </xsd:element>
821              <xsd:element name="contact">
822                <xsd:complexType>
823                  <xsd:sequence>
824                    <xsd:element name="name">
825                      <xsd:complexType mixed="true">
826                        <xsd:sequence>
827                          <xsd:element minOccurs="0" maxOccurs="unbounded"
       ref="ex:wrapper" />
828                        </xsd:sequence>
829                        <xsd:attributeGroup ref="ex:languageAttribute" />
830                      </xsd:complexType>
831                    </xsd:element>
832                    <xsd:element name="address">
833                      <xsd:complexType mixed="true">
834                        <xsd:sequence>
835                          <xsd:element minOccurs="0" maxOccurs="unbounded"
       ref="ex:wrapper" />
836                        </xsd:sequence>
```

FIG. 8a

```
837           <xsd:attributeGroup ref="ex:languageAttribute" />
838         </xsd:complexType>
839       </xsd:element>
840       <xsd:element name="phone">
841         <xsd:complexType mixed="true">
842           <xsd:sequence>
843             <xsd:element minOccurs="0" maxOccurs="unbounded" ref="ex:wrapper" />
844           </xsd:sequence>
845           <xsd:attributeGroup ref="ex:languageAttribute" />
846         </xsd:complexType>
847       </xsd:element>
848       <xsd:element name="email" type="xsd:string" />
849     </xsd:sequence>
850     <xsd:attributeGroup ref="ex:languageAttribute" />
851   </xsd:complexType>
852 </xsd:element>
853 </xsd:schema>
```

FIG. 8b

```xml
<?xml version="1.0"?>                            ╭─ 900
<xsd:schema
targetNamespace="http://schemas.company.com/nesue/schemaToolParam/1"
        xmlns:stp="http://schemas.company.com/nesue/schemaToolParam/1"
        xmlns:xsd="http://www.w3.org/2001/XMLSchema"
elementFormDefault="qualified" attributeFormDefault="unqualified">
        <!-- Things specified in the schema tool parameter file: -->
        <!-- * Schema to be inserted which will define the necessary attribute groups for
the -->
        <!--   the wrapper tags (the preamble). -->
        <!-- * The primary and secondary wrapper element names to be -->
        <!--   inserted around most every element of the source schema. -->
        <!-- * The elements in the original schema not to be wrapped -->
        <!--   (the exceptions). -->
        <!--          -->
        <xsd:attributeGroup name="wrapperTagAttributes">
                <xsd:attribute name="name" type="xsd:string" use="required"/>
                <xsd:attribute name="attributeGroup" type="xsd:string" use="required"/>
        </xsd:attributeGroup>
        <xsd:complexType name="namespace">
                <xsd:attribute name="prefix" type="xsd:string" use="required"/>
                <xsd:attribute name="uri" type="xsd:string" use="required"/>
        </xsd:complexType>
        <xsd:element name="parameters">
                <xsd:complexType>
                        <xsd:sequence>
                                <xsd:element name="targetNamespace"
type="stp:namespace"/>
                                <xsd:element name="universalAttribute" minOccurs="0">
                                        <xsd:complexType>
                                                <xsd:attribute name="namespacePrefix"
type="xsd:string" use="required"/>
                                                <xsd:attribute name="namespaceUri"
type="xsd:string" use="required"/>
                                                <xsd:attribute name="schemaLocation"
type="xsd:string" use="required"/>
                                        </xsd:complexType>
                                </xsd:element>
                                <xsd:element name="universalAttributeSchemaLocation"
type="xsd:string" minOccurs="0"/>
                                <xsd:element name="preamble">
                                        <xsd:complexType>
                                                <xsd:attribute name="file" type="xsd:string"
use="required"/>
                                        </xsd:complexType>
                                </xsd:element>
```

FIG. 9a

```xml
<xsd:element name="wrapper">
    <xsd:complexType>
        <xsd:attribute name="name" type="xsd:string" use="required"/>
    </xsd:complexType>
</xsd:element>
<xsd:element name="markAttributeGroup" minOccurs="0" maxOccurs="unbounded">
    <xsd:complexType>
        <xsd:attribute name="name" type="xsd:string" use="required"/>
    </xsd:complexType>
</xsd:element>
<xsd:element name="exception" minOccurs="0" maxOccurs="unbounded">
    <xsd:complexType>
        <xsd:attribute name="name" type="xsd:string" use="required"/>
        <xsd:attribute name="applyToDescendants" type="xsd:boolean" use="optional" default="true"/>
    </xsd:complexType>
</xsd:element>
<xsd:element name="outputFile">
    <xsd:complexType>
        <xsd:attribute name="name" type="xsd:string" use="required"/>
    </xsd:complexType>
</xsd:element>
                </xsd:sequence>
            </xsd:complexType>
        </xsd:element>
    </xsd:schema>
```

```
<?xml version="1.0"?>
<ex:contact xmlns:ex="http://schemas.company.com/nesue/example/rt/1">
  <ex:name>Joe Smith</ex:name>
  <ex:address>1 Main Street</ex:address>
  <ex:phone>(555) 555-1212</ex:phone>
  <ex:email>smith@smith.org</ex:email>
</ex:contact>
```

```
<?xml version="1.0"?>
<ex:contact xmlns:ex="http://schemas.company.com/nesue/example/rt/1">
  <ex:name language="Spanish">Jose Smith</ex:name>
  <ex:address>1 Main Street</ex:address>
  <ex:phone>(555) 555-1212</ex:phone>
  <ex:email>smith@smith.org</ex:email>
</ex:contact>
```

```
<?xml version="1.0"?>
<ex:contact xmlns:ex="http://schemas.company.com/nesue/example/rt/1">
  <ex:name><ex:wrapper language="Spanish">El Presidente </ex:wrapper>Joe Smith</ex:name>
  <ex:address>1 Main Street</ex:address>
  <ex:phone>(555) 555-1212</ex:phone>
  <ex:email>smith@smith.org</ex:email>
</ex:contact>
```

FIG. 10c

SYSTEM AND METHOD FOR ENHANCING XML SCHEMAS

FIELD OF THE INVENTION

The present invention relates generally to the field of computing. More particularly, the invention relates to a system and method for enhancing schemas.

BACKGROUND OF THE INVENTION

XML is short for eXtensible Markup Language, a programming language developed by the World Wide Web Consortium (W3C). Both XML and HTML are derivations of SGML, (Standard Generalized Markup Language), widely used for large documentation projects and the standard for creating a document structure. XML is actually a simplified but functionality-enhanced subset of SGML. XML is "extensible" because, unlike HTML, XML markup symbols are unlimited and self-defining.

HTML is widely used to display web pages on the Internet although HTML can also be used for documentation purposes and need not be rendered in a browser. HTML describes the content of a web page (mainly text and graphic images) only in terms of how it is to be displayed and interacted with. For example, in HTML the letter "p" placed within markup tags ("<p>") informs the browser that the text that follows should be displayed as a new paragraph. The content to be displayed as the new paragraph is delimited by "</p>", which signals the end of the paragraph. Thus, in HTML, content, and tags to control the presentation of the content, are intermingled. Hence it is difficult to write a program in HTML to display the first word of every sentence in bold because before every first word of every sentence a tag indicating "start bolding" would have to be inserted and after every first word of every sentence a tag indicating "stop bolding" would have to be inserted.

XML is conceptually related to HTML and is an HTML-like formatting language, but has more functionality than HTML. Like HTML, XML makes use of tags and attributes. But while HTML specifies what each tag and attribute means, and often, how the text between them will look in a browser, XML uses the tags only to delimit pieces of data, and leaves the interpretation of the data to the application that processes the XML file. Thus, a "<p>" in an XML file may be a price, a parameter, a person, an order number, etc. For example, "<p>" could indicate that the data that followed it was a telephone number. If the XML file were processed purely as data by a program, perhaps the telephone number would be dialed. If the XML file were stored with similar data on another computer, the phone number might be stored. If, like an HTML file, the XML file were displayed, perhaps the phone number would be displayed. Hence, XML allows designers to create their own customized tags, thus expanding the amount and kinds of information that can be provided about the data held in files and enabling the definition, transmission, validation, and interpretation of formatted data between applications and between organizations.

The rules for XML files are strict. A forgotten tag, or an attribute without quotes makes an XML file invalid and unusable, while in HTML such a practice is tolerated and is often explicitly allowed. The official W3C XML specification prohibits applications from trying to guess what the creator of an invalid XML file meant to do. If the file is invalid, an application processing the file has to stop and report an error. Thus, it is helpful to validate an XML file before using it and it is especially helpful to have an automated tool to do the validating. It is even more helpful to be able to define a valid structure of an XML file so that the automated validation tool would be able to either verify that a file is correct, or list out the mistakes that were found in the XML file. Such an enabling file structure definition is called a "schema".

"Schema" is a term borrowed from the database world where it is used to describe the structure of data in relational tables. In the context of XML, a schema describes a model for a class of files. For example, an XML schema can describe the possible arrangement of tags and text in a valid document.

In schemas, models are described in terms of constraints. A constraint defines what can appear in any given context. A content model constraint describes the order and sequence of elements. A datatype constraint describes valid units of data.

For example, a schema might describe a valid <address> with the content model constraint that it consist of a <name> element, followed by one or more <street> elements, followed by exactly one <city>, <state>, and <zip> element. The content of a <zip> might have a further datatype constraint that it consist of either a sequence of exactly five digits or a sequence of five digits, followed by a hyphen, followed by a sequence of exactly four digits. No other text is a valid ZIP code.

A schema enables machine validation of document structure. Every specific, individual file that does not violate any of the constraints of the schema is, by definition, valid according to that schema. For example, using the schema described above, a parser (validation tool) would be able to detect that the following address is not valid:

```
<address>
<name>John J. Jones</name>
<Street>256 Eight Bit Lane</street>
<city>East Yabip</city>
<state>MA</state>
<state>CT</state>
<zip>blue</zip>
</address>
```

The address above violates two constraints of the schema: it does not contain exactly one <state> and the ZIP code is not of the proper form. Therefore, the parser is able to flag the above address as invalid with respect to the <state> and <zip>.

There are many excellent reasons to validate an XML file, for example:

to determine that a purchase order received from a customer is not missing anything and doesn't have anything extra, and that everything the purchase order has is the right datatype (e.g., quantities are all positive numbers, prices are all decimal numbers with two digits after the decimal point, etc.).

to determine that information received from one corporate database is valid before the received data is converted and inserted into the target database. Invalid transactions should be rejected immediately so that the target database is not corrupted.

to verify that the XML file that will control an overnight batch process will be understood by the processor so that 2:00 am telephone calls can be avoided.

to verify that an XML stylesheet will correctly present each of 1000 XML documents being published on a CD-ROM without proofing each document manually.

Using a schema and a validating parser offers one way to check XML files. (It is understood that even the most advanced validating parser can fail to detect some kinds of errors. Valid files can still contain the wrong content, e.g., a purchase order may ask for a hundred boxes of staples when only ten were actually wanted.) One way to think of a schema is that it is a contract between a producer of information and a consumer of information. The contract is enforced through validation of a particular document against the schema.

One way to define schemas is through the XML Schema Definition language XSD. The XML Schema Definition language enables the definition of structure and data types for XML files according to the W3C XML Schema Part 2: Datatypes specification. A schema, (i.e., an XSD schema), defines the elements, attributes, and data types that conform to the W3C XML Schema Part 1: Structures specification for the XML Schema Definition language. This reference is based on the W3C Apr. 4, 2001 Proposed Recommendation for Datatypes and W3C Mar. 30, 2001 Proposed Recommendation for Structures.

XML schemas as defined by the W3C standard can define a rich set of datatypes including booleans, dates, times, URIs (Uniform Resource Identifiers), integers, decimal numbers, real numbers, currencies and intervals of time. In addition to these simple, predefined types, other types including aggregate types and user-defined types, can be defined. For example, a user could define a "PostalAddress" datatype and then define two elements, "ShippingAddress" and "BillingAddress" to be of that type. Attribute grouping enables the grouping of several attributes that apply to a number of elements. Substitution groups enable different flavors of attributes to be substituted based on features of the data content and express the relationship between similar kinds of elements. Substitution groups are typically used when one of several different elements would be appropriate to use in a given context. For example, a purchase order might permit an "address" to be used, but not necessarily specify what type of address should be used in a particular document. The definition of an "address" substitution group with elements "USAddress" element and "CanadianAddress" as members of that substitution group is a way of indicating that an "address" must either be a valid "USAddress" or a valid "CanadianAddress". Substitution groups also provide an easy way to add new members, such as "UKAddress". Substitution groups facilitate the modification of XML files over time and are analogous to the idea of "inheritance" in object-oriented programming, but are applied to data only.

Because datatypes and data structures are so robust, schemas can be extremely complex, running into the thousands of lines of code. To complicate matters, applications typically are not static. In many cases, as applications and user requirements evolve, it is necessary to make global changes to complex schemas according to a set of predefined rules, a time-consuming, difficult, and repetitive task. Hence, maintaining these complex schemas can become a task of enormous proportions with correspondingly enormous potential for the introduction of errors.

Thus it would be very helpful to have a way to describe certain attributes and element definitions external to the schema and to automatically generate an enhanced schema from a simpler input schema.

SUMMARY OF THE INVENTION

The schema enhancer is a system and method for enhancing XML schemas. The schema enhancer merges a design time schema, a parameter file and a preamble file (if present) into a run time schema. Definitions and syntax for elements and attributes to be added to the design time schema are contained in the preamble file. If no elements or attributes are to be added, the preamble file may be missing. Instructions for adding the elements and attributes of the preamble file are contained in the parameter file.

The schema enhancer collects information from the parameter file, the preamble file, if present, and the design time schema and generates a run time schema in accordance with a set of rules that may be provided by a governing body and the user-defined rules defined in the parameter and preamble files.

BRIEF DESCRIPTION OF THE DRAWINGS

The foregoing summary, as well as the following detailed description of preferred embodiments, is better understood when read in conjunction with the appended drawings. For the purpose of illustrating the invention, there is shown in the drawings exemplary constructions of the invention; however, the invention is not limited to the specific methods and instrumentalities disclosed. In the drawings:

FIG. 5 is an exemplary design-time schema in accordance with one embodiment of the invention;

FIG. 6 is an exemplary parameter file in accordance with one embodiment of the invention;

FIG. 7 is an exemplary preamble file in accordance with one embodiment of the invention;

FIGS. 8a–b is an exemplary run-time schema in accordance with one embodiment of the invention;

FIGS. 9a–b is an exemplary parameter schema definition file in accordance with one embodiment of the invention;

FIGS. 10a–c are exemplary XML documents.

DETAILED DESCRIPTION OF THE INVENTION

Exemplary Computing Environment

Figure 1:
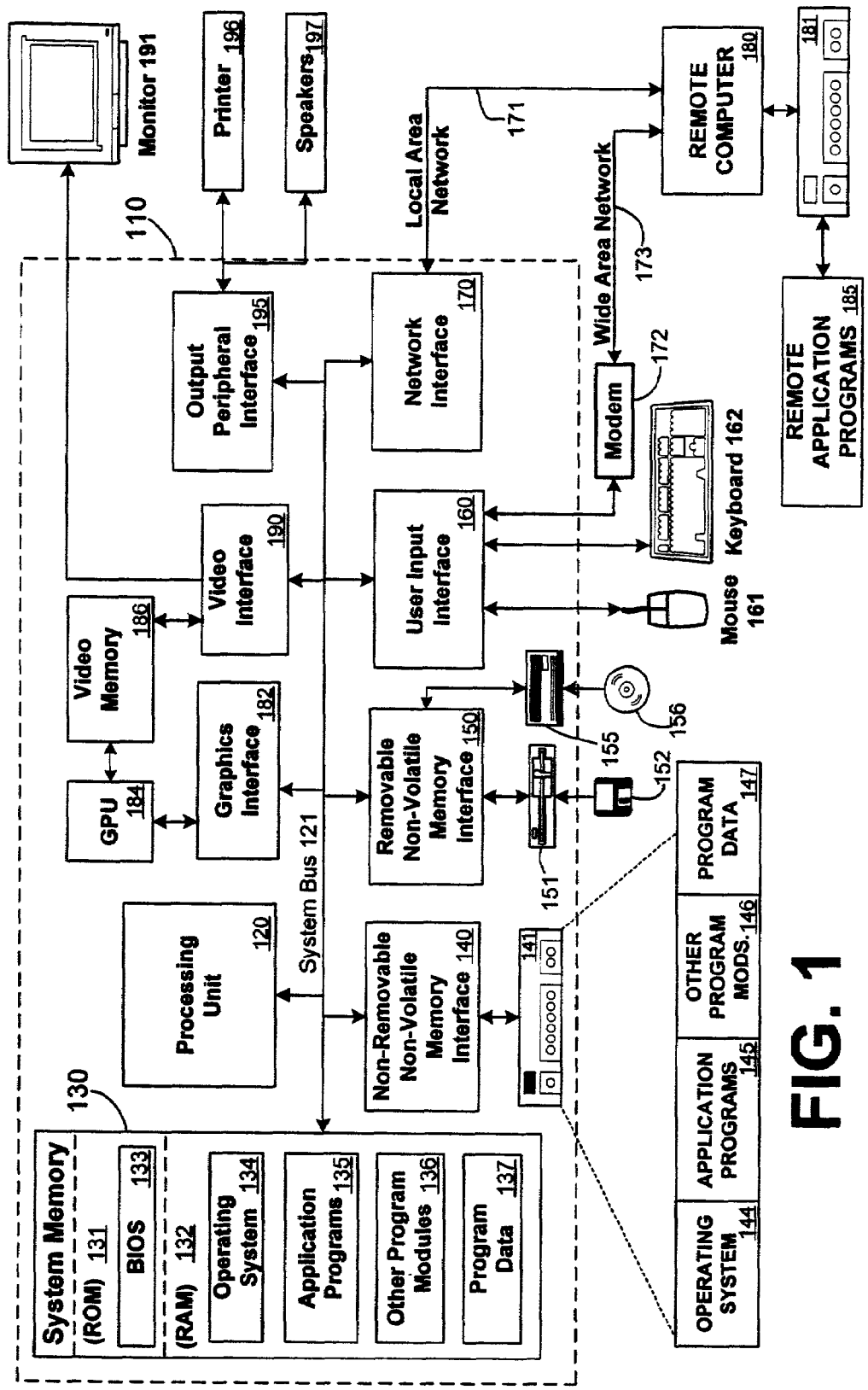
FIG. 1 is a block diagram representing an exemplary non-limiting computing environment in which aspects of the present invention may be implemented.

FIG. 1 and the following discussion are intended to provide a brief general description of a suitable computing environment in which the invention may be implemented. It should be understood, however, that handheld, portable, and other computing devices of all kinds are contemplated for use in connection with the present invention. While a general purpose computer is described below, this is but one example, and the present invention requires only a thin client having network server interoperability and interaction. Thus, the present invention may be implemented in an environment of networked hosted services in which very little or minimal client resources are implicated, e.g., a networked environment in which the client device serves merely as a browser or interface to the World Wide Web.

Although not required, the invention can be implemented via an application programming interface (API), for use by a developer, and/or included within the network browsing software which will be described in the general context of computer-executable instructions, such as program modules, being executed by one or more computers, such as client workstations, servers, or other devices. Generally, program modules include routines, programs, objects, components, data structures and the like that perform particular tasks or implement particular abstract data types. Typically, the functionality of the program modules may be combined or distributed as desired in various embodiments. Moreover, those skilled in the art will appreciate that the invention may be practiced with other computer system configurations. Other well known computing systems, environments, and/or configurations that may be suitable for use with the invention include, but are not limited to, personal computers (PCs), automated teller machines, server computers, handheld or laptop devices, multi-processor systems, microprocessor-based systems, programmable consumer electronics, network PCs, minicomputers, mainframe computers, and the like. The invention may also be practiced in distributed computing environments where tasks are performed by remote processing devices that are linked through a communications network or other data transmission medium. In a distributed computing environment, program modules may be located in both local and remote computer storage media including memory storage devices.

FIG. 1 thus illustrates an example of a suitable computing system environment 100 in which the invention may be implemented, although as made clear above, the computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156, such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1 provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus 121, but may be connected by other interface and bus structures, such as a parallel port, game port or a universal serial bus (USB).

A monitor 191 or other type of display device is also connected to the system bus 121 via an interface, such as a video interface 190. A graphics interface 182, such as Northbridge, may also be connected to the system bus 121. Northbridge is a chipset that communicates with the CPU, or host processing unit 120, and assumes responsibility for accelerated graphics port (AGP) communications. One or more graphics processing units (GPUs) 184 may communicate with graphics interface 182. In this regard, GPUs 184 generally include on-chip memory storage, such as register storage and GPUs 184 communicate with a video memory 186. GPUs 184, however, are but one example of a coprocessor and thus a variety of coprocessing devices may be included in computer 110. A monitor 191 or other type of display device is also connected to the system bus 121 via an interface, such as a video interface 190, which may in turn communicate with video memory 186. In addition to monitor 191, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

One of ordinary skill in the art can appreciate that a computer 110 or other client device can be deployed as part of a computer network. In this regard, the present invention pertains to any computer system having any number of memory or storage units, and any number of applications and processes occurring across any number of storage units or volumes. The present invention may apply to an environment with server computers and client computers deployed in a network environment, having remote or local storage. The present invention may also apply to a standalone computing device, having programming language functionality, interpretation and execution capabilities.

Validation of XML Files Using a Schema

Figure 2:
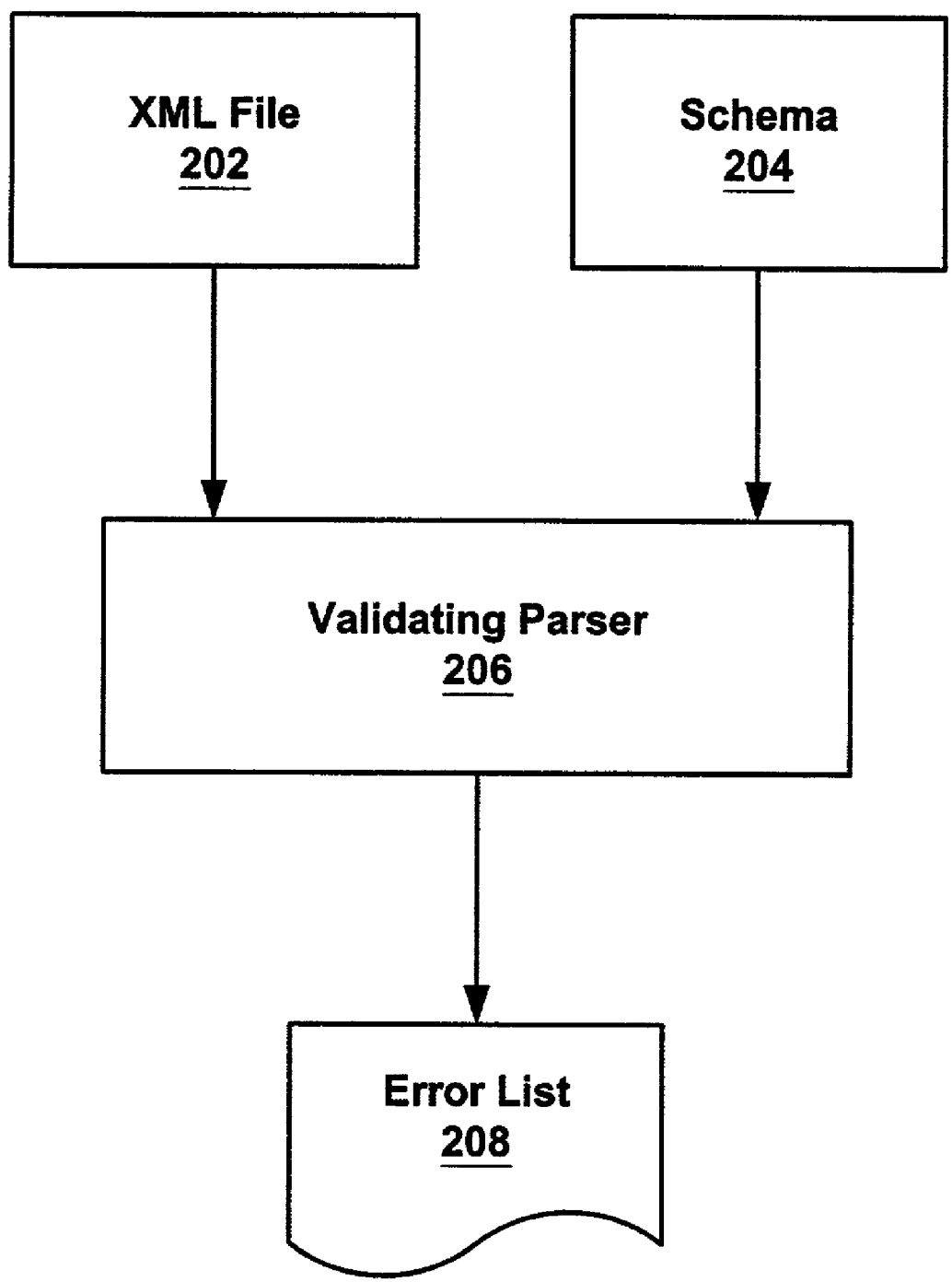
FIG. 2 is a block diagram representing an XML parser.

FIG. 2 illustrates an exemplary system for validating an XML file. An exemplary XML file 202 to be validated might be as follows:

```
<?xml version="1.0"?>
<ex:contact
xmlns:ex ="http://schemas.company.com/nesue/example/rt/1">
    <ex:name>Joe Smith</ex:name>
    <ex:address>1 Main Street</ex:address>
    <ex:phone>(555) 555-1212</ex:phone>
    <ex:email>smith@smith.org</ex:email>
</ex:contact>
```

XML file 202 and XSD Schema 204 are input to validating parser 206. An exemplary XSD schema 204, for example, might be as follows:

```
201    <?xml version="1.0"?>
202    <xs:schema
       targetNamespace="http://schemas.company.com/nesue/example/rt/1"
       xmlns:xs="http://www.w3.org/2001/XMLSchema"
       xmlns="http://schemas.company.com/nesue/example/rt/1">
203        <xs:element name="contact">
204            <xs:complexType>
205                <xs:sequence>
206                    <xs:element name="name" type="xs:string"/>
207                    <xs:element name="address" type="xs:string"/>
208                    <xs:element name="phone" type="xs:string"/>
209                    <xs:element name="email" type="xs:string"/>
210                </xs:sequence>
211            </xs:complexType>
212        </xs:element>
213    </xs:schema>
```

Line 202 defines the Namespace as "schemas.company.com/nesue/example/rt/1" and identifies the rules being followed as the authority W3C's 2001 XML Schema rules. As can be seen from the reproduced code, the element "contact" (line 203) is defined as a complex Type (line 204) comprising a sequence of name, (line 206), address (line 207), phone (line 208), and email (line 209). Name, address, phone and email are of datatype string (lines 206–209, respectively).

Parser 206 validates the XML file 202 to make sure it follows the XSD schema 204 and outputs a report 208 listing any errors found, or indicating that no errors have been found. In the example given, there are no errors.

Schema Enhancer

Figure 3:
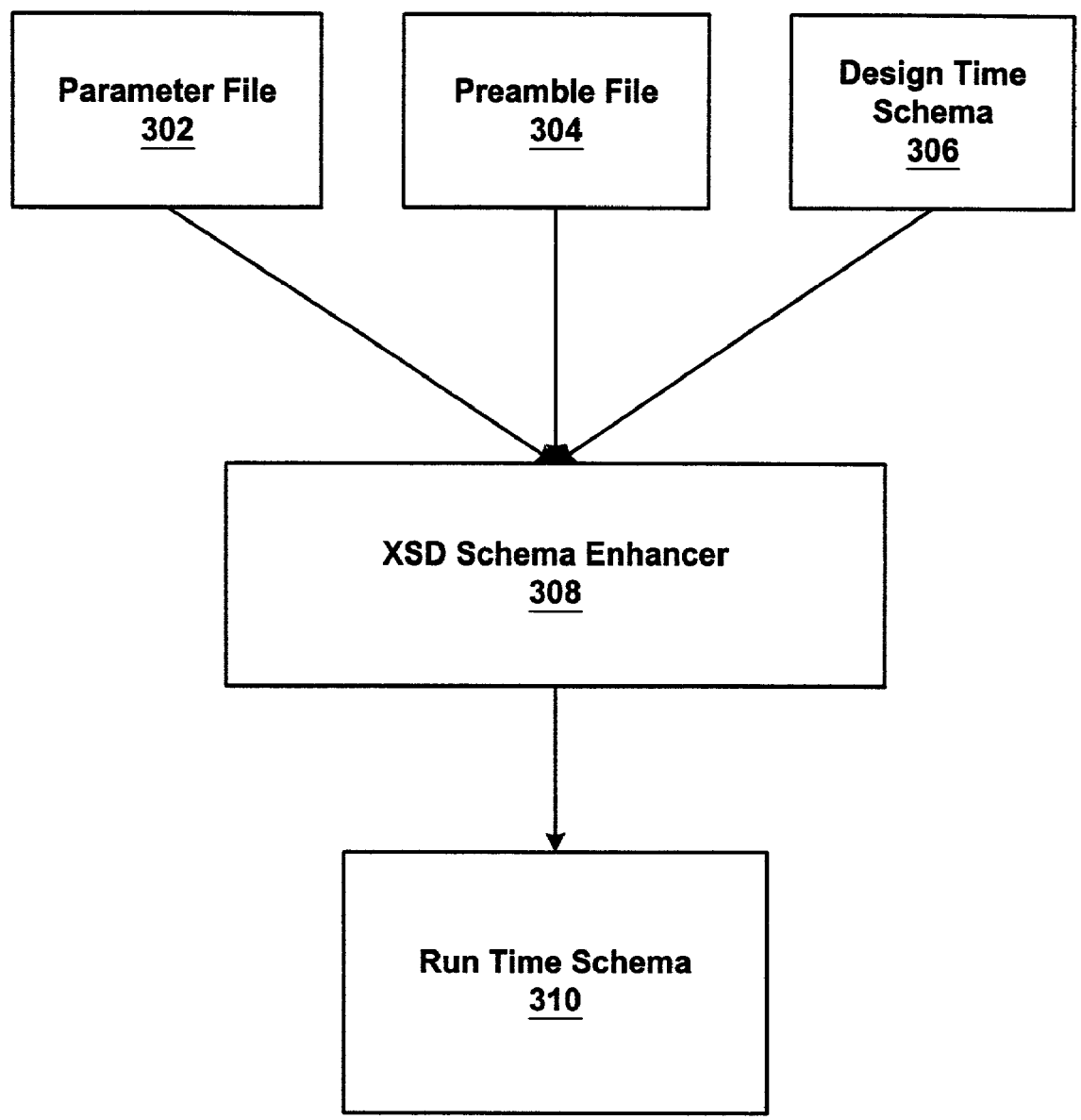
FIG. 3 is a block diagram illustrating the schema enhancer in accordance with one embodiment of the invention.

FIG. 3 is a block diagram illustrating a schema enhancer of the invention. Referring now to FIG. 3, in accordance with one embodiment of the invention, parameter file 302, preamble schema file 304 (optional) and design time schema 306 are input to schema enhancer 308. Schema enhancer 308 generates run-time schema 310 by merging the design time schema 306 with elements and attributes defined in the preamble file 304, if present, according to the rules of the parameter file 302. A component, as used herein, may be an element, attribute or the like. In this example schema enhancer 308 is used to add a language attribute and wrapper element, as defined in the preamble file 304, to the definitions of the elements specified in the parameter file 302. It should be understood that the examples provided are meant to exemplify the invention, not to limit it and the invention contemplates application to the use of any kind of schema convention.

Figure 4:
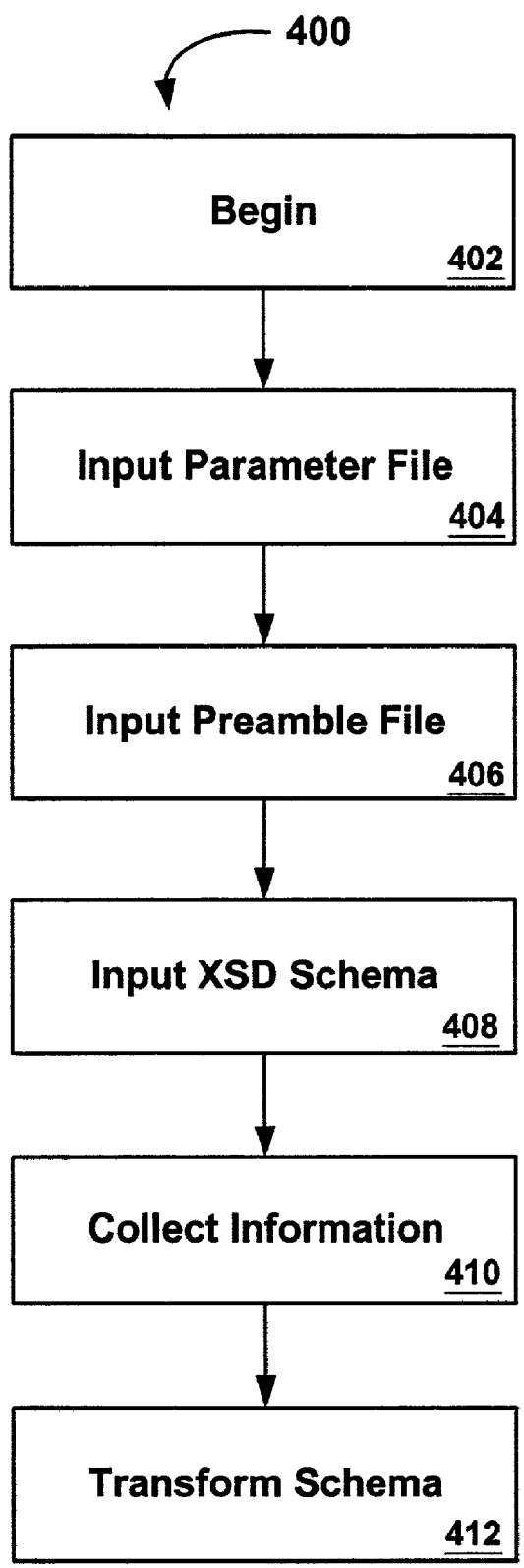
FIG. 4 is a flow diagram illustrating an exemplary method for generating a run-time schema in accordance with one embodiment of the invention.

FIG. 4 illustrates an exemplary method 400 of enhancing schemas in accordance with one embodiment of the invention. When the process is initiated, the parameter file 302, preamble file 304 and design time schema 306 are input. Information concerning the groups and substitution groups is collected from the design time schema 306. The design time schema 306 is transformed into the run time schema 310 by the schema enhancer 308. The schema enhancer 308 inserts attributes and elements defined in (optional) preamble file 304 based on the instructions in the parameter file 302, transforming design time schema 306 into run time schema 310.

The run time schema 310 produced may in turn be used to validate various files, such as exemplary document files 1000, 1010 and 1020 as illustrated in FIGS. 10a–c. Document files 1000, 1010 and 1020 are XML documents that comply with the exemplary runtime schema described below, and demonstrate the use of the inserted language attribute and wrapper element.

FIGS. 5, 6, 7, 8 and 9 represent exemplary files that may be processed or created by schema enhancer 308. It should be understood that the example provided below is merely exemplary and in fact any valid XML data structures may be defined, any valid rules specified, any valid design time schema modified, and any set of rules promulgated by any authority adopted as valid.

FIG. 5 illustrates an exemplary design time schema 500. Preferably the design time schema 500 is an XSD file to which will be added the elements and attributes as defined in preamble file 304, if any, according to the rules contained in parameter file 302 by the schema enhancer 308 to generate the run time schema 310.

Design time schema 500 is reproduced below:

```
501    <?xml version="1.0"?>
502    <xs:schema
targetNamespace="http://schemas.company.com/nesue/example/rt/1"
xmlns:xs="http://www.w3.org/2001/XMLSchema"
xmlns="http://schemas.company.com/nesue/example/rt/1">
503      <xs:element name="contact">
504        <xs:complexType>
505          <xs:sequence>
506            <xs:element name="name" type="xs:string"/>
507            <xs:element name="address" type="xs:string"/>
508            <xs:element name="phone" type="xs:string"/>
509            <xs:element name="email" type="xs:string"/>
510          </xs:sequence>
511        </xs:complexType>
512      </xs:element>
513    </xs:schema>
```

Line 502 defines the Namespace as "schemas.company.com/nesue/example/rt/1" and identifies the rules being followed as the authority W3C's 2001 XML Schema rules. As can be seen from the reproduced code, the element "contact" (line 503) is defined as a complex Type (line 504) comprising a sequence of name, (line 506), address (line 507), phone (line 508), and email (line 509). Name, address, phone and email are of datatype string (lines 506-509, respectively).

FIG. 6 illustrates an exemplary parameter file 600. Parameter file 600 preferably is an XML file containing rules and instructions for how the design time schema 306 (or, in the example, exemplary design time schema 500) is to be transformed into the run time schema 310 using the attributes and elements defined in the preamble file 304. A parameter file preferably follows a specific schema contained in an XSD file, called herein ParameterFile. An exemplary ParameterFile schema 900 is illustrated in FIG. 9. Parameter file 600 is reproduced below.

```
601    <?xml version="1.0"?>
602    <stp:parameters
xmlns:stp="http://schemas.company.com/nesue/schemaToolParam/1">
603      <stp:targetNamespace prefix="ex"
uri="http://schemas.company.com/nesue/example/rt/1"/>
604      <stp:preamble file="example-preamble.xsd"/>
605      <stp:wrapper name="wrapper"/>
606      <stp:markAttributeGroup name="languageAttribute"/>
607      <stp:exception name="email"/>
608      <stp:outputFile name="examplert.xsd"/>
609    </stp:parameters>
```

Line 601 identifies the file as an XML file. Line 603 identifies the target namespace as "schemas.company.com/nesue/example/rt/1", and the preamble file to be used as "example-preamble.xsd", line 604. If no preamble file were to be input, line 604 would be missing. Line 605 indicates that the language attribute (line 606) can be added to any element, and even wrapped around text within an element using the wrapper element. Line 607 indicates that language attribute should not be added to the element email. Line 608 identifies the name of the output file (run time schema 310) as "examplert.xsd".

FIG. 7 illustrates an exemplary preamble file 700. Preferably the preamble file 700 is an XSD file that defines the meaning and syntax of the elements and attributes that will be added to the design time schema 306 by the XSD enhancer 308 to generate the run time schema 310. Preamble file 700 is reproduced below.

```
701    <?xml version="1.0"?>
702    <xs:schema xmlns:xs="http://www.w3.org/2001/XMLSchema"
xmlns ex="http://schemas.company.com/nesue/example/rt/1"
targetNamespace="http://schemas.company.com/nesue/example/rt/1">
703      <xs:attributeGroup name="languageAttribute"
         xmlns:xsd="http://www.w3.org/2001/XMLSchema">
704        <xs:attribute name="language">
705          <xs:simpleType>
706            <xs:restriction base="xs:string">
707              <xs:enumeration value="English"/>
708              <xs:enumeration value="French"/>
709              <xs:enumeration value="Spanish"/>
710              <xs:enumeration value="German"/>
711              <xs:enumeration value="other"/>
712            </xs:restriction>
713          </xs:simpleType>
714        </xs:attribute>
715      </xs:attributeGroup>
716      <xs:element name="wrapper"
xmlns:ex="http://schemas.company.com/nesue/example/rt/1">
717        <xs:complexType mixed="true">
718          <xs:attributeGroup ref="ex:languageAttribute"/>
719        </xs:complexType>
720      </xs:element>
721    </xs:schema>
```

Line 700 identifies the file as an XML file. Line 702 identifies the namespace as "schemas.company.com/nesue/example/rt/1". Line 703 identifies an attribute group "languageAttribute", which contains one attribute "language" of simple type based on the datatype "string", restricted to "English", "French", "Spanish", "German" and "other" (lines 707–711). Element "wrapper" is defined at line 717, of mixed elements and plain text, i.e., in this case a wrapper element may have text contained within it. The attributes apply to the wrapper element which describes what language the text is written in. Because no elements were specified within the wrapper element definition, only text can appear in this case. In this particular situation the mixed complex type allows plain text to be contained between the <wrapper> and </wrapper> tags.

FIGS. 8*a*–*b* illustrates an exemplary run time schema 800. Preferably the run time schema 800 is the XSD file design time schema 500 to which has been added the elements and attributes as defined in preamble file 700, if any, according to the rules contained in parameter file 600 by the XSD enhancer 308.

Run time schema 800 is reproduced below:

invoked as a subcomponent of another application, activated via a web service or other remoting protocol, or invoked by accessing a particular page on a web server using a browser. Many other ways of invoking the schema enhancer 308 are possible and are contemplated by the present invention. In one embodiment, the name of the schema to transform is provided on the command line as input.

It should be understood that the order of the steps 404, 406 and 408 have been selected for exemplary purposes only and

```
801    <?xml version="1.0"?>
802    <xsd:schema xmlns:ex="http://schemas.company.com/nesue/example_rt/1"
elementFormDefault="qualified" targetNamespace="http://schemas.company.
com/nesue/example/rt/1" xmlns:xsd="http://www.w3.org/2001/XMLSchema">
803      <xsd:attributeGroup name="languageAttribute">
804        <xsd:attribute name="language">
805          <xsd:simpleType>
806            <xsd:restriction base="xsd:string">
807              <xsd:enumeration value="English"/>
808              <xsd:enumeration value="French"/>
809              <xsd:enumeration value="Spanish"/>
810              <xsd:enumeration value="German"/>
811              <xsd:enumeration value="other"/>
812            </xsd:restriction>
813          </xsd:simpleType>
814        </xsd:attribute>
815      </xsd:attributeGroup>
816      <xsd:element name="wrapper">
817        <xsd:complexType mixed="true">
818          <xsd:attributeGroup ref="ex:languageAttribute"/>
819        </xsd:complexType>
820      </xsd:element>
821      <xsd:element name="contact">
822        <xsd:complexType>
823          <xsd:sequence>
824            <xsd:element name="name">
825              <xsd:complexType mixed="true">
826                <xsd:sequence>
827                  <xsd:element minOccurs="0" maxOccurs="unbounded" ref="ex:wrapper"/>
828                </xsd:sequence>
829                <xsd:attributeGroup ref="ex:languageAttribute"/>
830              </xsd:complexType>
831            </xsd:element>
832            <xsd:element name="address">
833              <xsd:complexType mixed="true">
834                <xsd:sequence>
835                  <xsd:element minOccurs="0" maxOccurs="unbounded" ref="ex:wrapper"/>
836                </xsd:sequence>
837                <xsd:attributeGroup ref="ex:languageAttribute"/>
838              </xsd:complexType>
839            </xsd:element>
840            <xsd:element name="phone">
841              <xsd:complexType mixed="true">
842                <xsd:sequence>
843                  <xsd:element minOccurs="0" maxOccurs="unbounded" ref="ex:wrapper"/>
844                </xsd:sequence>
845                <xsd:attributeGroup ref="ex:languageAttribute"/>
846              </xsd:complexType>
847            </xsd:element>
848            <xsd:element name="email" type="xsd:string"/>
849          </xsd:sequence>
850          <xsd:attributeGroup ref="ex:languageAttribute"/>
851        </xsd:complexType>
852      </xsd:element>
853    </xsd:schema>
```

Referring again to FIG. 4, in step 402, the schema enhancer 308 is initiated. Preferably, the schema enhancer 308 is invoked on a command line, although alternative methods of invoking the schema enhancer 308 are contemplated. For example, the schema enhancer 308 may be in practice any ordering or combination of these steps may be implemented by the conceived invention. At step 404 the enhancer retrieves exemplary parameter file 600 from the directory where the tool is invoked. Parameter file 600 is validated against parameter schema file 900.

If the parameter file 600 is invalid, the process stops, and an error list is preferably generated. If the parameter file is valid, the schema enhancer 308 opens the parameter file 600 and retrieves the parameters for this particular transformation.

Preferably, the parameter file 600 enables customization of the transformation process. For example, parameter file 600 may specify one or more elements to be excluded from the addition of the attribute group, (e.g., for example line 607 specifies that the language attribute of line 606 should not be applied to the email element). Different levels of exclusion are preferably allowed. Preferably, the parameter file provides XPATH pattern matching and transformation services. XPATH pattern matching and transforming enables rules to exclude or include nodes to be injected with elements or metadata based on whether the XPATH addresses those nodes. Alternatively, any suitable pattern matching and transformation service may be utilized.

In one embodiment, as discussed above the parameter file 600 may be used to specify the target namespace (on line 603) for the generated schema (exemplary run time schema 800), which need not match the target namespace of the input schema (exemplary design time schema 500). Preferably, an optional "universal attribute" namespace may alternatively be specified. For all elements in the schema an any Attribute is preferably added if the universal attribute namespace is specified.

The parameter file 600 preferably specifies a "preamble" file (on line 604), which will subsequently be prepended to the design time schema (exemplary design time schema 500). Preferably also included within the parameter file 600 is a specification of which attribute groups (line 606) and which elements (lines 605) to add pervasively to every complex type within the design time schema 500. The parameter file 600 preferably also specifies the name of the output file (on line 608) where the run time schema (exemplary run time schema 800) should be placed.

Schema enhancer 308 preferably reads parameter file 600 with a .NET based validating schema reader, although it should be understood that any suitable validating schema reader is contemplated by the invention. The validating schema reader checks that parameter file 600 has valid syntax. If errors are found in the parameter file 600, the errors are preferably reported and the process ends. If there are no errors in the parameter file 600, the process continues.

Schema enhancer 308 preferably also validates the inputs from the command line and parameter file 600. If the inputs are not valid, the errors are reported and the process ends.

At step 406, if the inputs are valid, the preamble file 304 (e.g., exemplary preamble file 700), if any, is input. Preamble file 700 is preferably loaded into an XML Schema DOM ("document object module") using a .NET validating reader. If there are errors in the preamble file 700, the errors are preferably reported and the process ends. If there are no errors in the preamble file 700, the process continues. If the preamble file 700 is valid, schema enhancer 308 ensures that design time schema 306 (e.g., exemplary design time schema 500) exists. If design time schema 500 exists, design time schema 500 is preferably loaded into a schema DOM, using a NET validating reader.

If all the schemas and files have passed the validation steps, at step 410, schema enhancer 308 collects information about the run time schema 800 to be generated. For example, information such as the target namespace for the runtime schema 800 is retrieved from the parameter file 600 at line 603. The preamble schema (lines 701–720) is copied to the run time schema 800 (lines 801-820). Preferably attribute groups and elements to be added to the design time schema 500 are not added to the preamble schema 700. Information about substitution groups and regular groups is retrieved from design time schema 500 lines 501-513.

At step 412 the design time schema 500 is retrieved and traversed again, and this time the design time schema 500 is transformed by copying the transformation results to the runtime schema 800. For example, design time schema 500 lines 503–506 are copied to run time schema 800 at lines 821–824, 832, 840 and 848 of the run time schema 800. Certain rules required by W3C are relaxed temporarily in order to accommodate matters of efficiency.

For example, when features such as but not limited to a filtering feature is enabled, the maxOccurs specification in some portions of the schema may need to be relaxed. This kind of feature is not illustrated in the provided examples. Preferably, the parameter file controls when this relaxation feature is enabled.

Each element of the schema preferably is examined. Attributes and elements are added based on the rules of the parameter file 600 and the definitions of the preamble file 700. Preferably, attributes are not added to elements listed on the exclusion list as discussed above.

Thus, there have been described systems and methods for generating an enhanced run-time schema. Those skilled in the art will appreciate that numerous changes and modifications can be made to the preferred embodiments of the invention, and that such changes and modifications can be made without departing from the spirit of the invention. It is intended, therefore, that the appended claims cover all such equivalent variations as fall within the true spirit and scope of the invention.

What is claimed is:

1. A computer-implemented system for generating a run-time XML schema, the system comprising:
   an XML input schema comprising a definition of a first set of elements;
   an XML preamble file comprising a definition of a first component comprising an attribute to be added into the run-time XML schema;
   an XML parameter file comprising a rule, which modifies the XML input schema based on the definition of the first component, wherein the rule includes an element from the first set of elements to be excluded from the attribute; and
   a schema enhancer module resident on a computer, which generates an XML schema by modifying the XML input schema based on the rule in the XML parameter file and the definition of the first component in the XML preamble file,
   wherein the run-time XML schema comprises an XSD schema.

2. The system of claim 1, wherein the first component further comprises an attribute of the first element.

3. The system of claim 1, wherein the first component further comprises a second element.

4. The system of claim 1, wherein the XML input schema further comprises a definition of an attribute associated with the first element.

5. The system of claim 1, wherein the XML input schema comprises an XSD schema.

6. The system of claim 1, wherein the schema enhancer adheres to a set of rules provided by an authority.

7. The system of claim 6, wherein the authority is the World Wide Web Consortium.

8. The system of claim 1, wherein the schema enhancer validates the XML parameter file.

9. The system of claim 8, further comprising an XML parameter file schema for validating the XML parameter file.

10. A method for generating an a run-time XML schema on a computer, the method comprising:
- providing to a software module resident on a computer an XML input schema comprising at least two elements;
- providing, to the software module resident on the computer, an XML parameter file comprising an instruction, which modifies the XML input schema, the parameter file also specifying an element to be excluded from an attribute to be added into the run-time XML schema;
- providing, to the software module, a preamble file which defines the meaning and syntax of the attribute to be added into the run-time XML schema; and
- generating, by the software module resident on the computer, the run-time XML schema by modifying the XML input schema according to the instruction in the XML parameter file, wherein the run-time XML schema comprises an XSD schema.

11. The method of claim 10, wherein the at least two elements are associated with an attribute.

12. The method of claim 10, wherein generating the run-time XML schema comprises inserting the attribute into the XML input schema according to an instruction in the XIVJL parameter file.

13. The method of claim 11, wherein the XML schema is modified by modifying an existing relationship between an element and the attribute according to the instruction in the XML parameter file.

14. The method of claim 10, wherein generating the XML schema further comprises collecting information concerning the run-time XML schema from at least one of the XML input schema, the XML parameter file, and the ZML preamble file.

15. The method of claim 14, wherein the information concerning the XML schema comprises information about at least one of a group and a substitution group.

16. The method of claim 10, wherein generating the XML schema comprises copying the XML preamble file into the XML schema.

17. A computer storage media containing computer-executable instructions implemented by a computer for performing a method for transformation of a first design-time XML schema into a second run-time schema, the method comprising:
- providing the first XML schema comprising an element associated with an attribute, wherein a relationship between the element and the attribute is defined;
- providing a parameter file comprising a rule for modifying the relationship between the element and the attribute, wherein the rule enables customization of the transformation of the first XML schema into the second XML schema by adding elements and attributes of a preamble file;
- providing the preamble file which defines the meaning and syntax of the elements and attributes to be added into the second XML schema; and
- generating a second XML schema by inserting into the first schema, the elements and attributes defined in the preamble file, according to the rule included in the parameter file, wherein, the parameter file further specifies one or more elements to be excluded from an addition of one of the attributes to be added, and wherein the run-time XML schema comprises an XSD schema.

* * * * *